(12) United States Patent
Hall

(10) Patent No.: US 11,353,587 B2
(45) Date of Patent: Jun. 7, 2022

(54) LIDAR DEPTH MEASUREMENT SYSTEMS AND METHODS

(71) Applicant: Facebook Technologies, LLC, Menlo Park, CA (US)

(72) Inventor: Michael Hall, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 822 days.

(21) Appl. No.: 16/163,109

(22) Filed: Oct. 17, 2018

(65) Prior Publication Data

US 2019/0293796 A1 Sep. 26, 2019

Related U.S. Application Data

(60) Provisional application No. 62/648,021, filed on Mar. 26, 2018.

(51) Int. Cl.
| | |
|---|---|
| *G01S 17/89* | (2020.01) |
| *G01S 17/08* | (2006.01) |
| *G01S 7/483* | (2006.01) |
| *G06T 7/50* | (2017.01) |
| *G01S 7/51* | (2006.01) |

(52) U.S. Cl.
CPC .............. *G01S 17/89* (2013.01); *G01S 7/483* (2013.01); *G01S 7/51* (2013.01); *G01S 17/08* (2013.01); *G06T 7/50* (2017.01)

(58) Field of Classification Search
CPC ............ G01S 17/89; G01S 17/08; G01S 7/51; G01S 7/483; G01S 7/484; G06T 7/50; G06T 7/521

USPC ........................................................ 356/4.01
See application file for complete search history.

(56) References Cited

U.S. PATENT DOCUMENTS

| 10,324,171 B2* | 6/2019 | Niclass | ................. G01S 7/4817 |
| 2007/0024841 A1* | 2/2007 | Kloza | .................... G01S 17/10 |
| | | | 356/5.03 |

OTHER PUBLICATIONS

"Lens," Wikipedia, downloaded from https://en.wikipedia.org/wiki/Lens Jul. 7, 2021, see p. 2 for "diverged (spread)". 9 pages (Year: 2021).*
"Introduction to Modulation Transfer Function," Edmund optics, downloaded from https://www.edmundoptics.com/knowledge-center/application-notes/optics/introduction-to-modulation-transfer-function/ Jul. 22, 2021, 5 pages. (Year: 2021).*

(Continued)

*Primary Examiner* — Daniel L Murphy
(74) *Attorney, Agent, or Firm* — FisherBroyles, LLP

(57) ABSTRACT

The disclosed system may include (1) a light source that emits light pulses into a field of view, (2) a light sensor array that captures light reflected from the field of view resulting from the light pulses, (3) a light control subsystem that (a) controls an emission timing of the light source and (b) controls a capture timing of the light sensor array relative to the emission timing of the light source, and (4) a depth measurement subsystem that generated depth measurements of at least some of the field of view based at least in part on output from the light sensor array, where operation of the light control subsystem is based at least in part on prior knowledge of the field of view. Various other methods and systems are also disclosed.

20 Claims, 16 Drawing Sheets

(56) References Cited

OTHER PUBLICATIONS

"Modulation Transfer Function," SPIE, downloaded Jul. 22, 2021 from https://spie.org/publications/tt52_131_modulation_transfer_function?SSO=1, 2 pages. (Year: 2021).*
Ruokamo et al., "An 80 x 25 Pixel CMOS Single-Photon Range Image Sensor with a Flexible On-Chip Time Gating Topology for Solid State 3D Scanning", ESSCIRC 2017—43rd IEEE European Solid State Circuits Conference, Sep. 11-14, 2017, 4 pages.

* cited by examiner

Depth
System
200

Method 300

Flash
Light and
SPAD
Timing
700

LIDAR DEPTH MEASUREMENT SYSTEMS AND METHODS

CROSS REFERENCE TO RELATED APPLICATION

This application claims the benefit of U.S. Provisional Application No. 62/648,021, filed 26 Mar. 2018, the disclosure of which is incorporated herein, in its entirety, by this reference.

BACKGROUND

In many diverse technological environments, such as device manufacturing, autonomous vehicle operation, terrestrial mapping, virtual reality, and others, mapping of a physical environment has become a useful function. While several types of technologies may be employed to perform such mapping, time-of-flight (TOF) mapping has become widely used across various applications and environments.

One type of TOF mapping employed in some systems involves the use of LIDAR (Light Detection and Ranging). In some applications, LIDAR may involve the emission of one or more short light pulses into a physical environment by an observing device, and the subsequent detection, at the device, of reflections of those pulses from objects in the physical environment. In some cases, one or more light sensors may be enabled during predetermined timing windows to capture the reflected light. Based on an area of the physical environment that is reflecting the pulses, and on the elapsed time after emission at which the reflections of those pulses are received at the device, as indicated by the timing windows, the distance between the device and an object in that area of the environment may be determined to some degree of precision.

SUMMARY

As will be described in greater detail below, the instant disclosure describes systems and methods for LIDAR depth measurement. In one example, a system may include (1) a light source that emits light pulses into a field of view, (2) a light sensor array that captures light reflected from the field of view resulting from the light pulses, (3) a light control subsystem that (a) controls an emission timing of the light source and (b) controls a capture timing of the light sensor array relative to the emission timing of the light source, and (4) a depth measurement subsystem that generates depth measurements of at least some of the field of view based at least in part on output from the light sensor array, where operation of the light control subsystem is based at least in part on prior knowledge of the field of view. In some embodiments, the prior knowledge of the field of view may include prior depth measurements of at least some of the field of view. In some examples, the prior knowledge of the field of view may include at least one of a position or an orientation of at least one of the light source or the light sensor array.

In some examples, the light control subsystem may control the emission timing and the capture timing to generate present output from the light sensor array while the depth measurement subsystem generates depth measurements based at least in part on prior output from the light sensor array. Also, in some embodiments, the light sensor array, the light control subsystem, and the depth measurement subsystem may be arranged in a stack configuration.

In some embodiments, the light sensor array may include a plurality of single-photon avalanche diodes. Moreover, in some examples, (1) the light control subsystem may control a first capture timing by generating a plurality of depth windows separated by depth spacings, and (2) each depth window is captured multiple times for capturing the reflected light by the plurality of single-photon avalanche diodes.

In some examples, (1) the light source may include an array of addressable light sources, and (2) the light control subsystem may select a subset of the addressable light sources to illuminate a selected region of interest in the field of view using one of the emitted light pulses.

In various embodiments, the light control system (1) may control a first capture timing including a first depth range and a first depth spacing between time gates corresponding to a first emitted light pulse, and (2) may control a second capture timing including a second depth range and a second depth spacing between time gates corresponding to a second emitted light pulse different from the first emitted light pulse, where at least one of the second depth range or the second depth spacing is different from the first depth range or the first depth spacing. In some examples, the light control system (1) may control, for a first plurality of light sensors of the light sensor array, a first capture timing including a first depth range and a first depth spacing between time gates corresponding to a first emitted light pulse, and (2) may control, for a second plurality of light sensors of the light sensor array, a second capture timing including a second depth range and a second depth spacing between time gates corresponding to the first emitted light pulse, where at least one of the second depth range or the second depth spacing is different from the first depth range or the first depth spacing.

In some embodiments, the light control subsystem may control a first capture timing including a single time gate covering a first depth range corresponding to a first emitted timing pulse.

In some examples, (1) the light source may include a scanning light source that illuminates one of a plurality of selectable regions of interest in the field of view at a time, and (2) the light control subsystem may control the emission timing by causing the scanning light source to illuminate two or more of the selectable regions of interest in succession.

In some embodiments, the system may further include a lens that spreads reflected light from one of the plurality of selectable regions of interest over a corresponding subset of a plurality of light sensors of the light sensor array. Additionally, in some examples, the light control subsystem may disable those of the plurality of light sensors not included in the corresponding subset of the plurality of light sensors. In some embodiments, the depth measurement subsystem may include one or more time-to-digital converters that measure a length of time associated with capturing the reflected light at the corresponding subset of the plurality of light sensors. Also, in some examples, the time-to-digital converters may be selectively couplable to the corresponding subset of the plurality of light sensors for each of the plurality of selectable regions of interest.

In another embodiment, a method may include (1) emitting light pulses into a field of view according to an emission timing, (2) capturing light reflected from a plurality of regions of interest of the field of view resulting from the light pulses according to a capture timing relative to the emission timing, and (3) generating depth measurements of at least some of the field of view based at least in part on the captured light, where the capture timing for each of the plurality of regions of interest is based at least in part on prior knowledge of the field of view. In some examples, the capture timing may include at least one of a depth range or a depth spacing for each at least some of the plurality of regions of interest based at least in part on the prior knowledge of the field of view.

In another embodiment, a method may include (1) emitting light pulses sequentially into selected regions of interest of a field of view according to an emission timing, (2) capturing light reflected from the selected regions of interest of the field of view resulting from the light pulses according to a capture timing relative to the emission timing, and (3) generating depth measurements of at least some of the field of view based at least in part on the captured light, where at least one of the selected regions of interest, the emission timing, or the capture timing are based at least in part on prior knowledge of the field of view. In some examples, at least one of the selected regions of interest may include a rectangular region of interest or a circular region of interest.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
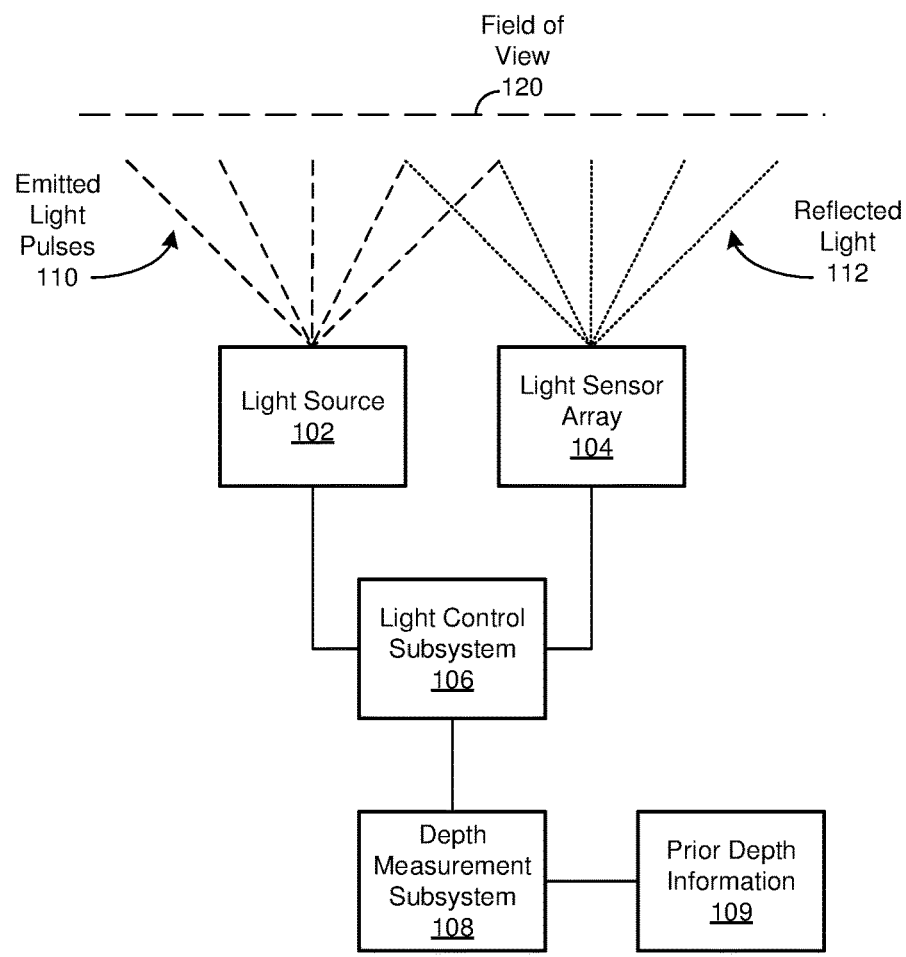
FIG. 1 is a block diagram of an exemplary system for LIDAR depth measurement.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for LIDAR depth measurement. As will be explained in greater detail below, embodiments of the instant disclosure may employ previously known information about the environment in which depth measurements are being made to provide more efficient mapping (e.g., in terms of space, power, time, or the like) of that environment.

The following will provide, with reference to FIGS. 1-16, detailed descriptions of systems and methods of LIDAR-based depth measurement. A discussion of exemplary depth systems employing LIDAR is presented in conjunction with FIGS. 1 and 2, and an exemplary method of LIDAR depth measurement is provided in connection with FIG. 3. In association with FIGS. 4-8, exemplary systems and methods using flash-based LIDAR are discussed, and in conjunction with FIGS. 9-13, exemplary embodiments systems and methods employing scan-based LIDAR are described. Another exemplary system for LIDAR depth measurement is discussed in connection with FIG. 14, an exemplary HMD incorporating the system of FIG. 14 is described in connection with FIG. 15, and an exemplary NED including the system of FIG. 14 is presented.

Hereinafter, various embodiments of the systems and methods for LIDAR depth measurement are described as deployed within the environment of a virtual reality device, augmented reality device, mixed reality device, or similar type of device. However, other devices and systems, such as terrestrial mapping systems, device manufacturing systems, and autonomous vehicles, may employ aspects of one or more systems and/or methods disclosed herein for generating depth measurements.

FIG. 1 is a block diagram of an exemplary depth system 100 for LIDAR-based depth measurement. Depth system 100 may include, for example, a light source 102, a light sensor array 104, a light control subsystem 106, a depth measurement subsystem 108, and prior depth information 109. As depicted in FIG. 1, light source 102 may emit light pulses 110 into or toward a field of view 120, and light sensor array 104 may receive or capture reflected light 112 resulting from reflection of emitted light pulses 110 by one or more objects or other physical surfaces within field of view 120. In some embodiments, field of view 120 may be any portion of a local environment of depth system 100 into which light pulses 110 may be emitted, and from which reflected light 112 may be received, by depth system 100 at a current location and/or current orientation of depth system 100 within the local environment.

In at least some embodiments, light source 102 may be any light source that emits light pulses 110 of sufficient intensity to illuminate field of view 120 or some portion thereof (e.g., a region of interest within field of view 120). Also, in some examples, light source 102 may generate pulses of sufficiently short duration to facilitate capture within distinguishable timing windows at light sensor array 104, resulting in an acceptable level of resolution for an application in which depth system 100 is employed. Example light sources 102 may include, but are not limited to, various types of lasers, such as one or more vertical-cavity surface-emitting lasers (VCSELs). Also, in some embodiments, light sensor arrays 104 may include a plurality of light sensors capable of capturing reflected light 112 received at depth system 100 from field of view 120 within a selectable time window. In some examples, the sensors of light sensor array 104 may be arranged in a two-dimensional pattern (e.g., a pattern of horizontal rows and vertical columns) such that reflected light 112 from a portion of field of view 120 may be received or captured from one or more corresponding light sensors of light sensor array 104, thus providing an indication of a horizontal and vertical location or position within field of view 120 from which reflected light 112 was received. The light sensors of light sensor array 104, in some examples, may be single-photon avalanche diodes (SPADs), although other types of light sensors may be employed in other embodiments.

At least some embodiments of depth system 100, as well as other depth systems described below, may also include one or more optical elements (e.g., lenses, mirrors, prisms, and/or the like), possibly in conjunction with one or more actuators, in conjunction with light source 102 and/or light sensor array 104 to direct emitted pulses 110 toward field of view 120 and/or direct reflected light 112 to light sensor array 104.

In some embodiments, light control subsystem 106 may control an emission timing of light source 102 such that emitted light pulses 110 of a desired duration are generated at some selected frequency. The emission timing, in some examples, may also cause emitted light pulses 110 to be directed to selected regions of interest within field of view 120 at corresponding time periods. Also, in some embodiments, light control subsystem 106 may control a capture timing of light sensor array 104 relative to the emission timing. For example, light control subsystem 106 may generate time gates or windows for each of one or more groups of sensors of light sensor array 104 to scan one or more depth ranges of field of view 120 at one or more depth resolutions. In some examples, depth measurement subsystem 108 may control or influence the emission timing and/or capture timing employed by light control subsystem 106.

Depth measurement subsystem 108, in some embodiments, may receive information (e.g., output signals) from light sensor array 104 and, based on that information, generate depth measurements of at least some of field of view 120. In some examples, depth measurement subsystem 108 may receive or access prior depth information 109 (e.g., from a database) of field of view 120 so that depth measurement subsystem 108 may control the operation (e.g., the emission timing and/or the capture timing) of light control subsystem 106. In some examples, prior depth information 109 may include depth information for one or more portions of field of view 120, such as complete or partial mapping information corresponding to field of view 120. Also, in at least some examples, prior depth information 109 may also include at least one of the position or orientation of one or more portions of depth system 100 (e.g., light source 102 and/or light sensor array 104). This position and/or orientation information may be useful in cases in which at least some portions of depth system 100 are moving within the environment being mapped. Consequently, in such examples, various techniques involving simultaneous localization and mapping (SLAM) may be employed to generate mapping information corresponding to field of view 120. In some embodiments, using prior depth information 109 in such a manner may allow depth measurement subsystem 108 to direct light control subsystem 106 to operate efficiently, such as by measuring depth in selected portions of field of view 120, selectively restricting the depth range for light sensor array 104 in one or more portions of field of view 120, and so on. Also, while FIG. 1 indicates depth measurement subsystem 108 may access prior depth information 109, light control subsystem 106, additionally or alternatively, may access prior depth information 109 in other embodiments to control the emission timing of emitted light pulses 110 and/or the capture timing of light sensor array 104.

Figure 2:
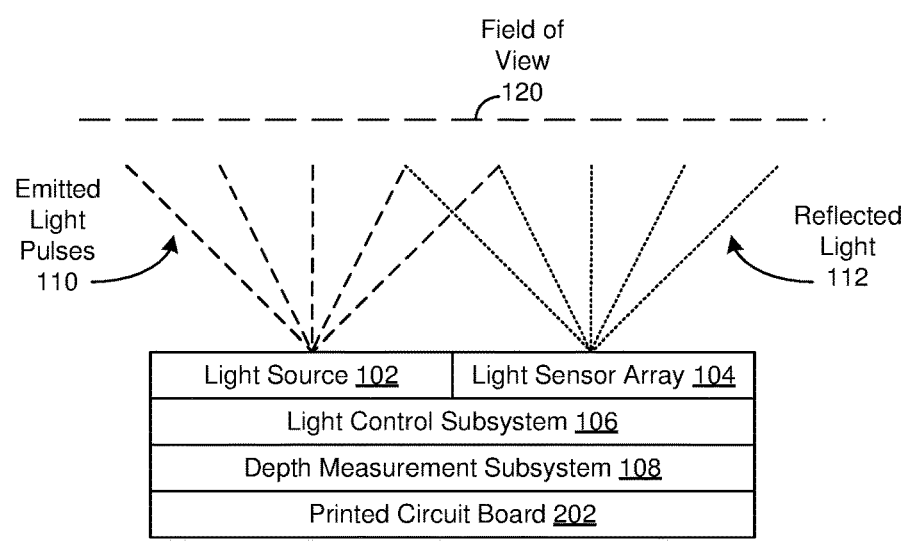
FIG. 2 is a block diagram of another exemplary system for LIDAR depth measurement.

FIG. 2 is a block diagram of an exemplary depth system 200 in which possible relative locations or positions of light source 102, light sensor array 104, light control subsystem 106, and/or depth measurement subsystem 108 are illustrated. As depicted in FIG. 2, light source 102 and light sensor array 104 may be positioned atop light control subsystem 106 in some embodiments. Further, light control subsystem 106 may be located atop at least a portion of depth measurement subsystem 108. Such a system may be viewed as a component "stack" that may facilitate efficient use of space within a device employing depth system 200. Moreover, such a stacked arrangement may allow short electrical connections between light control subsystem 106 and any or all of light source 102, light sensor array 104, and depth measurement subsystem 108, thus potentially facilitating reduced signal propagation delays therebetween. In some examples, light source 102 and/or light sensor array 104 may consume a small footprint or baseline, thus allowing light source 102 and light sensor array 104 to be located close to each other, thus reducing parallax therebetween. Also, in some embodiments, light source 102 may include multiple one or more individual light components that may be integrated within light sensor array 104.

In some embodiments, light control subsystem 106 and depth measurement subsystem 108 may form at least a portion of a pipelined processing architecture. For example, depth measurement subsystem 108 may generate depth measurements based at least in part on output previously provided from light sensor array 104 (e.g., output representing reflected light 112 captured from a previous emitted light pulse 110) while light control subsystem 106 controls the emission timing and the capture timing to generate a present output from light sensor array 104 (e.g., output representing reflected light 112 captured from a more recently emitted light pulse 110).

Further, in some embodiments, a stack of light source 102, light sensor array 104, light control subsystem 106, and some portion of depth measurement subsystem 108 may be mounted on a printed circuit board 202 or other substrate such that depth system 200 may be closely integrated within another system, such as a virtual reality system, an augmented reality system, or a mixed reality system.

Figure 3:
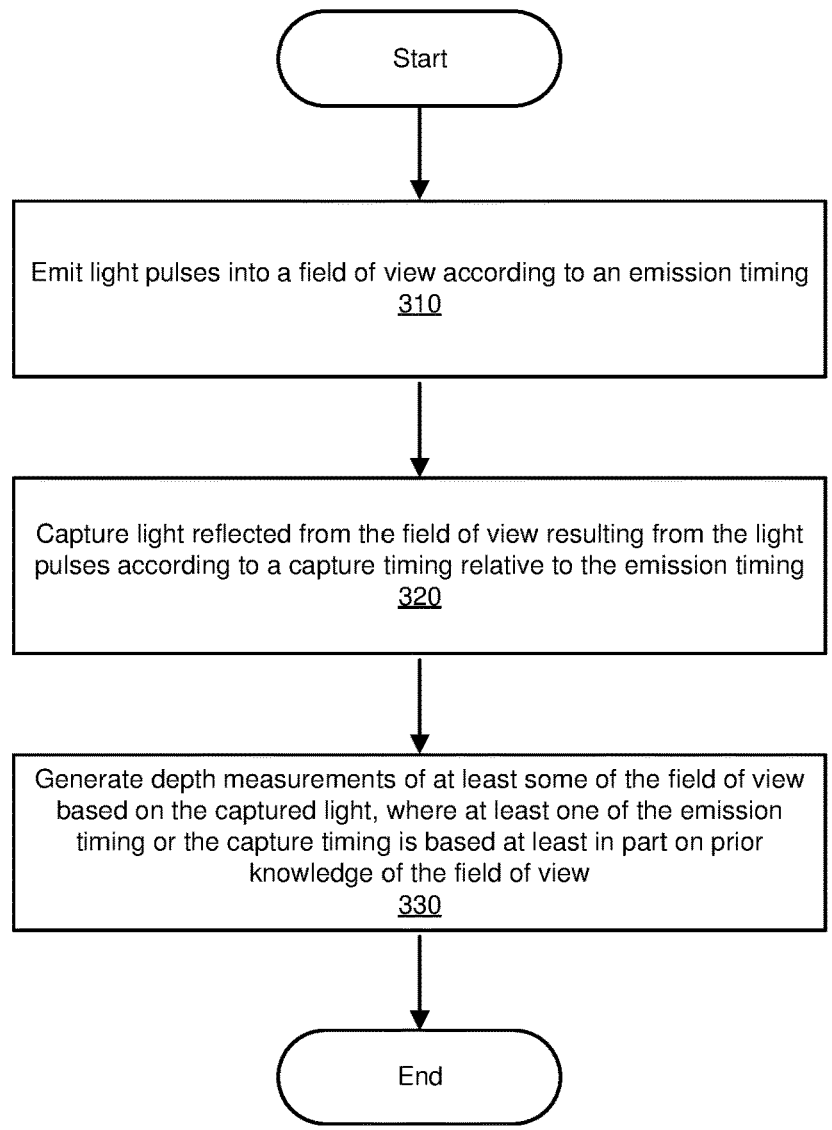
FIG. 3 is a flow diagram of an exemplary method for LIDAR depth measurement.

FIG. 3 is a flow diagram of an exemplary method 300 of LIDAR depth measurement. In some embodiments, one or more steps shown in FIG. 3 may be performed using any suitable computer-executable and/or computing system, including depth systems 100 and 200 of FIGS. 1 and 2. In one example, one or more of the steps shown in FIG. 3 may represent an algorithm whose structure includes and/or is represented by multiple sub-steps, examples of which are provided in greater detail below.

As illustrated in FIG. 3, at step 310, light pulses (e.g., light pulses 110) may be emitted (e.g., by light source 102) into a field of view (e.g., field of view 120). At step 320, light (e.g., reflected light 112) reflected from the field of view resulting from the light pulses may be captured (e.g., by light sensor array 104) according to a capture timing relative to the emission timing. In some examples, light control subsystem 106 may generate one or both of the emission timing and the capture timing, as described above. At step 330, depth measurements of at least some of the field of view may be generated (e.g., by depth measurement subsystem 108) based on the captured light, where at least one of the emission timing or the capture timing is based at least in part on prior knowledge of the field of view (e.g., prior depth information 109).

In some examples of method 300, the prior knowledge of the field of view may include recent depth information of at least portions of the field of view. In some embodiments, recent and accurate depth information about a particular region of interest (ROI) within the field of view may facilitate less frequent scanning or probing of that region of interest for some period of time, and may facilitate more narrowly targeted scanning or probing of the region of interest at the approximate depth indicated by the recent depth information. Other ways in which prior depth information may be employed to direct or control the generation of depth information are also possible.

Figure 4:
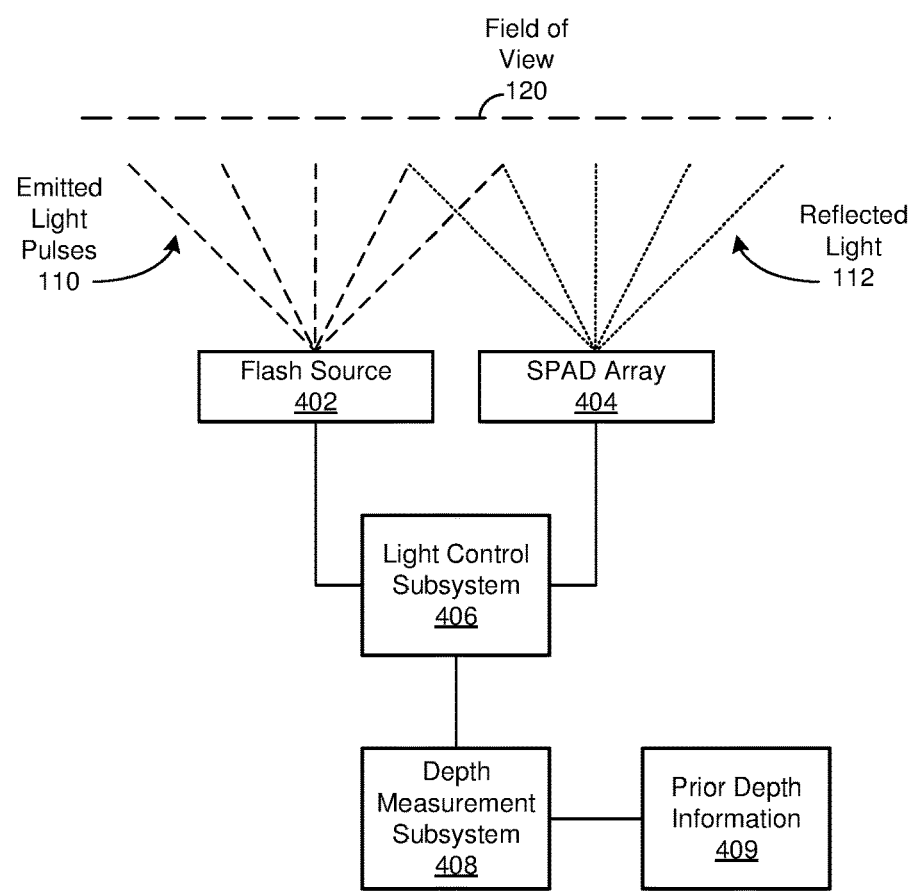
FIG. 4 is a block diagram of an exemplary flash-based system for LIDAR depth measurement.

FIG. 4 is a block diagram of a flash-based depth system 400 that may serve, in some embodiments, as a particular type or class of depth systems 100 and 200 of FIGS. 1 and 2. As depicted in FIG. 4, flash-based depth system 400 may include a flash source 402 (e.g., serving as light source 102), a SPAD array 404 (e.g., serving as light sensor array 104), a light control subsystem 406 (e.g., serving as light control subsystem 106), a depth measurement subsystem 408 (e.g., serving as depth measurement subsystem 108), and prior depth information 409 (serving as prior depth information 109).

In some embodiments, flash source 402 may emit one or more light pulses 110 that illuminate an entirety of field of view 120, or a significant portion thereof. An example of flash source 402 may be a laser light source (e.g., one or more VCSELs) that may periodically or repeatedly generate a short light pulse 110 to illuminate field of view 120. In other embodiments, flash source 402 may be a plurality (e.g., an array) of VCSELs or similar light sources that are either individually addressable, or addressable in groups (e.g., by light control subsystem 406), with each such light source being capable of illuminating a corresponding portion or area of field of view 120. Consequently, in such examples, less than all of the light sources of flash source 402 may emit a light pulse 110, thus illuminating a corresponding selectable portion of field of view 120. Depth measurement subsystem 408, by way of light control subsystem 406, may employ such functionality in situations in which at least some portion of field of view 120 may not currently require depth mapping, such as when that same portion of field of view 120 was recently mapped, thus possibly allowing some delay before mapping that portion again. Depth measurement subsystem 408, in some embodiments, may make such a determination based on previous depth measurements of field of view 120, as indicated in prior depth information 409. In such examples, prior depth information 409 may include timestamp information indicating when prior depth mappings for corresponding portions of field of view 120 were generated, whether any spatial movement was indicated by any objects detected in field of view 120, and so on.

Figure 5:
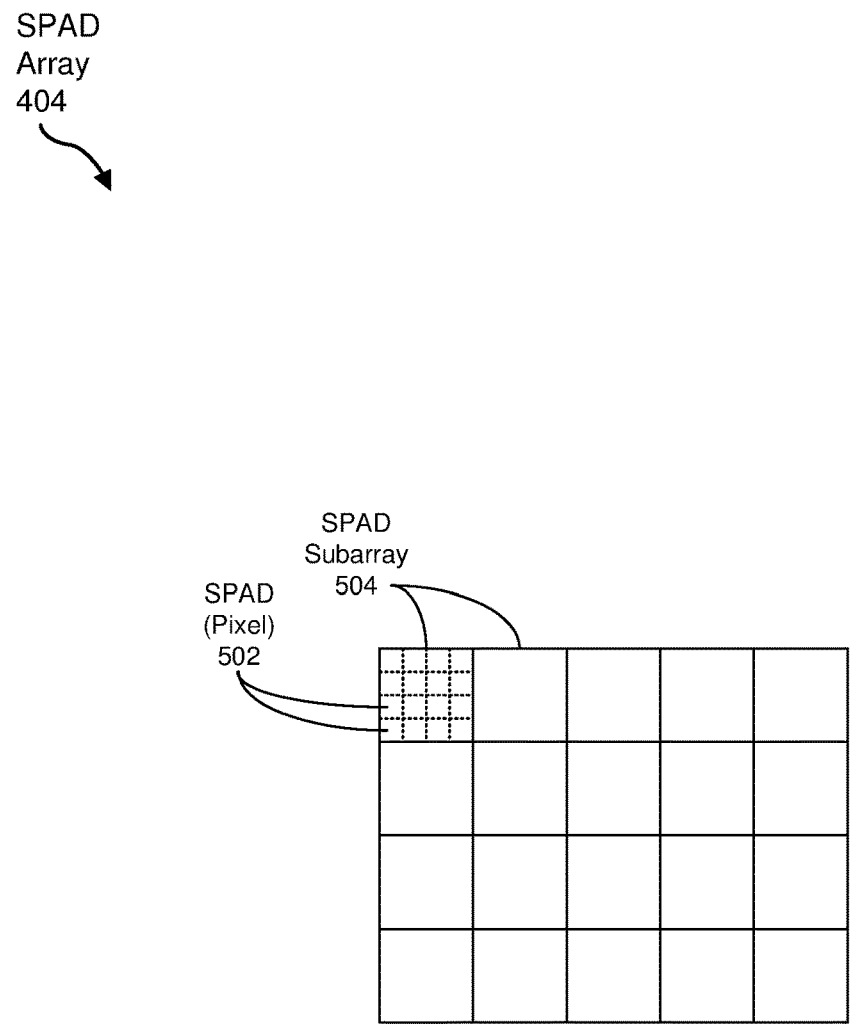
FIG. 5 is a graphical depiction of an exemplary light sensor array employable in the system of FIG. 4.

FIG. 5 is a graphical depiction of SPAD array 404 of FIG. 4. In some examples, SPAD array 404 may include a plurality (e.g., a two-dimensional array) of individual SPADs 502, each of which may be referenced as a pixel of SPAD array 404. In some embodiments, each SPAD 502 may receive reflected light 112 from a corresponding portion or area of field of view 120. Also, in some embodiments, as depicted in FIG. 5. Individual SPADs 502 may be grouped into a plurality of SPAD subarrays 504, where each SPAD 502, and thus each SPAD subarray 504, may receive reflected light 112 from a corresponding portion or area of field of view 120. In other examples, each SPAD subarray 504 may include a single SPAD 502. Also, in other embodiments, individual light sensors other than SPADs 502 may be employed.

In at least some examples, each SPAD 502 may generate an output (e.g., an electrical current) if a single photon (or a small number of photons) is received during a "time gate," or window signal during which SPAD 502 is enabled (e.g., as determined by the capture timing generated by light control subsystem 406). In some examples, SPADs 502 of a particular SPAD subarray 504 may be configured to respond to the same time gate. Also, in some embodiments, receipt of a greater number of photons than is sufficient to generate the output may not result in a greater magnitude of output. Moreover, in some examples, the spreading of an emitted light pulse 110 over at least a significant portion of field of view 120 may result in a limited number of photons being received as reflected light 112 by each SPAD 502. Consequently, in some embodiments, light control subsystem 406 may cause flash source 402 to emit multiple light pulses 110 (e.g., tens, hundreds, or thousands of light pulses 110) over some period of time, where one or more particular SPADs 502 (e.g., SPADs 502 of a particular SPAD subarray 504) may be gated at the same point in time after each light pulse 110 is generated. In response, light control subsystem 406 or depth measurement subsystem 408 may collect or "bin" the number of times the particular SPAD 502 indicates a photon was received, thus possibly providing a more accurate indication of depth information within the particular area associated with SPAD 502.

Figure 6:
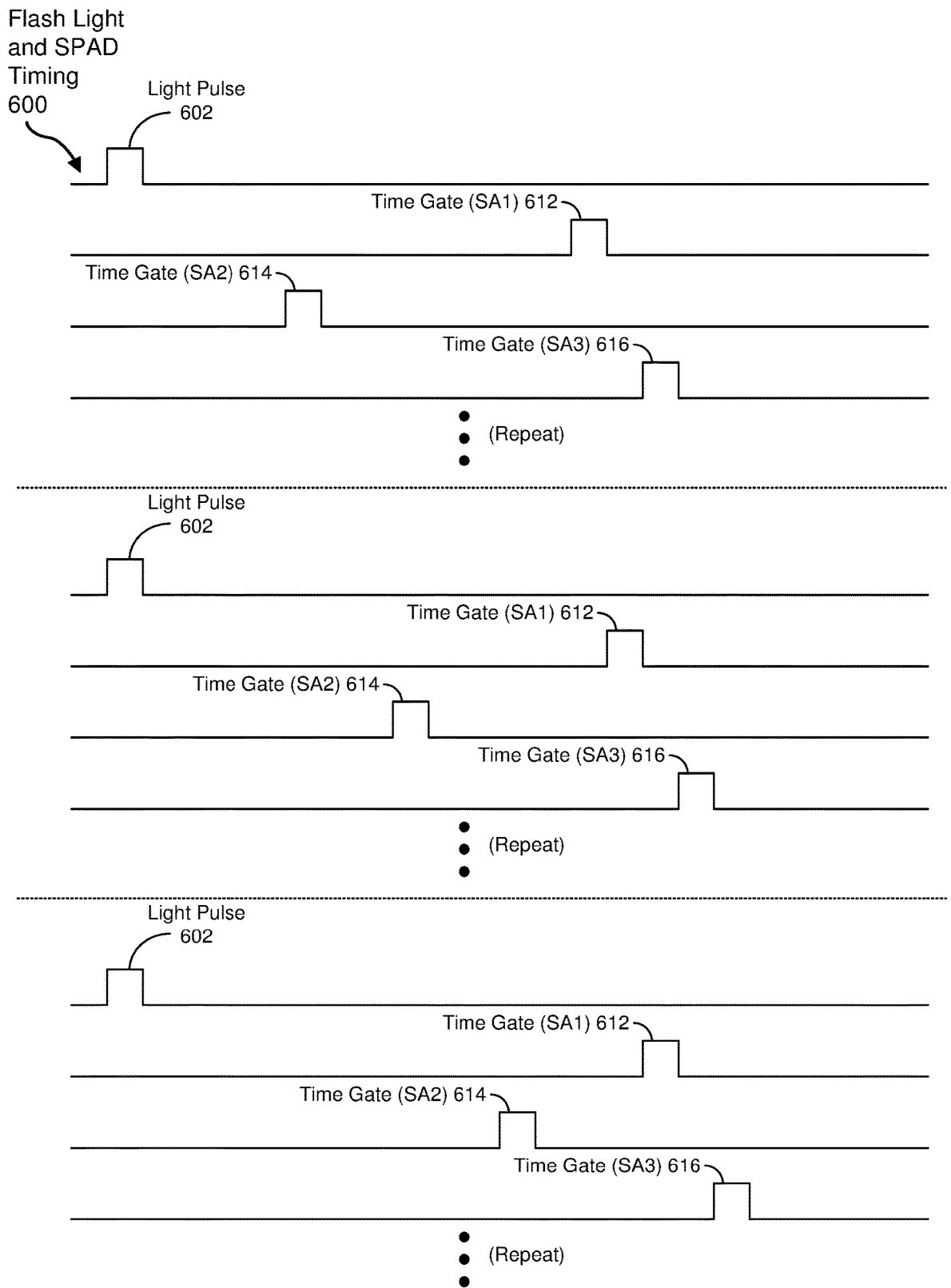
FIG. 6 is a timing diagram for exemplary operation of the flash-based system of FIG. 4 facilitating different depth ranges and resolutions for different portions of the light sensor array.

FIG. 6 is a timing diagram (flash light and SPAD timing 600) for exemplary operation of flash-based depth system 400 facilitating different depth ranges and resolutions for different portions of SPAD array 404. As illustrated, each cycle may begin with a light pulse 602 (e.g., an emitted light pulse 110 from flash source 402) of a predetermined width (e.g., on the order of tens or hundreds of picoseconds of full width at half maximum (FWHM). In some examples, light pulse 602 is followed by a time gate 612, 614, 616 associated with each of one or more SPAD subarrays 504 of SPAD array 404. In at least some embodiments, light pulse 602 is caused by the emission timing by which light control subsystem 406 controls flash source 402, while time gates 612, 614, 616 are caused by the capture timing by which light control subsystem 406 controls SPAD array 404. Also, as indicated above, the amount of time elapsed from light pulse 602 to time gate 612, 614, 616 for a corresponding SPAD subarray 504 may be related (e.g., linearly) to the distance or depth from flash-based depth system 400 being probed.

In some examples, time gates 612, 614, 616 may represent a window during which SPADs 502 of a corresponding SPAD subarray 504 may output some level of electrical current in response to receiving or capturing at least one photon of reflected light 112 from field of view 120 (e.g., in response to light pulse 602). In some embodiments, time gates 612, 614, 616 may represent one or more timing signals (e.g., load start and stop signals, a sampling signal, and so on) that collectively determine time gates 612, 614, 616. Further, in some examples, the period of the light pulse 602 signal may be determined at least in part by the depth or distance of interest from flash-based depth system 400, in conjunction with the desired speed by which the local area about flash-based depth system 400 is to be mapped.

In some examples, at most a single time gate 612, 614, 616 may occur for a corresponding SPAD subarray 504 after each light pulse 602 due to tight timing tolerances that may be involved to accurately generate a depth measurement for each region of interest of field of view 120 that is associated with each SPAD subarray 504. Also, in some embodiments, SPADs 502 of each SPAD subarray 504 may or may not capture (and thus register) a photon, even in the presence of an object at a distance detectable using a time gate 612, 614, 616 corresponding to that distance. Such circumstances may occur when light pulse 602 is employed to illuminate an entirety, or a significant portion, of field of view 120. Accordingly, in some embodiments, fewer photons may be available for reflection as reflected light 112 during time gate 612, 614, 616. As a result, in some embodiments, each, or at least some, SPAD subarrays 504 may be controlled using the same time gate 612, 614, 616 for each of multiple instances (e.g., tens, hundreds, or thousands) of light pulse 602. This repeating of light pulses 602 and associated time gates 612, 614, 616 is indicated in FIG. 6. Based on the results of repeated gate times 612, 614, 616 located at the same time position relative to light pulse 602 within a limited period of time, more accurate depth measurements may be made. In some examples, individual outputs from each SPAD 502 may be collected or binned, and possibly compared to some threshold, so that a more accurate or stable determination of whether a surface of an object is located at the depth or distance being tested or probed using that SPAD 502. After a number of repetitions of light pulse 602 at a particular time gate 612, 614, 616 for each SPAD subarray 504, the delay of one or more of time gates 612, 614, 616 relative to light pulse 602 may be changed, as depicted in FIG. 6, at which point multiple repetitions of light pulses 602 and associated time gates 612, 614, 616 may be employed to probe the new depth or distance for the region of interest associated with each SPAD subarray 504 SA1, SA2, and SA3, respectively.

Time gates 612, 614, 616 for three different SPAD subarrays 604 (labelled SA1, SA2, and SA3, respectively) are depicted in FIG. 6. However, other numbers of SPAD subarrays 504, with corresponding time gates, may be used in other examples. As illustrated in FIG. 6, SPAD subarray 504 SA1 may have time gate 612 occurring at a different time relative to light pulse 602 than time gate 614 for SPAD subarray 504 SA2, both of which may occur at a different time than time gate 616 for SPAD subarray 504 SA3. In other words, the particular depth for each region of interest in field of view 120 being probed by a corresponding SPAD subarray 504 for each light pulse 602 may be different. In this example, due to time gate 614 for SPAD subarray 504 SA2 occurring sooner after light pulse 602 than either time gate 612 for SPAD subarray 504 SA1 or time gate 616 for SPAD subarray 504 SA3, SPAD subarray 504 SA2 may be probing a distance within its associated regions of interest closer to flash-based depth system 400 than the regions of interest associated with either SPAD subarray 504 SA1 or SPAD subarray 504 SA3. In some examples, the particular depth being probed within each region of interest of field of view 120 may be based at least in part on prior depth information 409, as discussed above.

In some embodiments, the resolution of the depth measurements associated with the region of interest corresponding to each SPAD subarray 504 may be the same or different at any particular time. More specifically, after a particular depth is probed for each region of interest, the amount of change in the delay of associated time gates 612, 614, 616 relative to light pulse 602 may be different, resulting in differing depth resolutions among the regions of interest for each corresponding SPAD subarray 504. In the particular example of FIG. 6, the amount of change in delay for time gate 614 associated with SPAD subarray 504 SA2 from one depth measurement to the next is greater than that for either time gate 612 of SPAD subarray 504 SA1 or time gate 616 of SPAD subarray 504 SA3, resulting in less depth resolution in the depth measurements for the regions of interest associated with SPAD subarray 504 SA2 compared to those measurements for the regions of interest associated with either SPAD subarray 504 SA1 or SPAD subarray 504 SA3. In some embodiments, the depth resolution for each region of interest may be based at least in part on prior depth information 409, as discussed above.

In other examples, such as when a limited amount of prior depth information 409 is available, light control subsystem 406 may instead probe the same depth of each region of interest simultaneously using each corresponding SPAD subarray 504 (e.g., time gates 612, 614, 616 may be synchronized). In such examples, SPAD subarrays 504 SA1, SA2, SA3 may capture depth information at the same depths and/or depth resolutions (e.g., by synchronizing time gates 612, 614, 616).

In some embodiments, fewer than all regions of interest of field of view 120 that may be probed by SPAD subarrays 504 may be of interest, at least from time to time. In such cases, less than all SPAD subarrays 504 may be attempting to capture reflected light 112 (e.g., by way of light control subsystem 406 not providing time gates 612, 614, 616 for one or more SPAD subarrays 504) during periods of time. Additionally, in some examples in which portions of flash source 402 (e.g., groups of VCSELs associated with each SPAD subarray 504) are individually controllable or addressable, those portions of flash source 402 that generate emitted light pulses 110 to be received by those SPAD subarrays 504 not being gated to capture reflected light 112 may be disabled accordingly, thus potentially saving at least some electrical energy.

Figure 7:
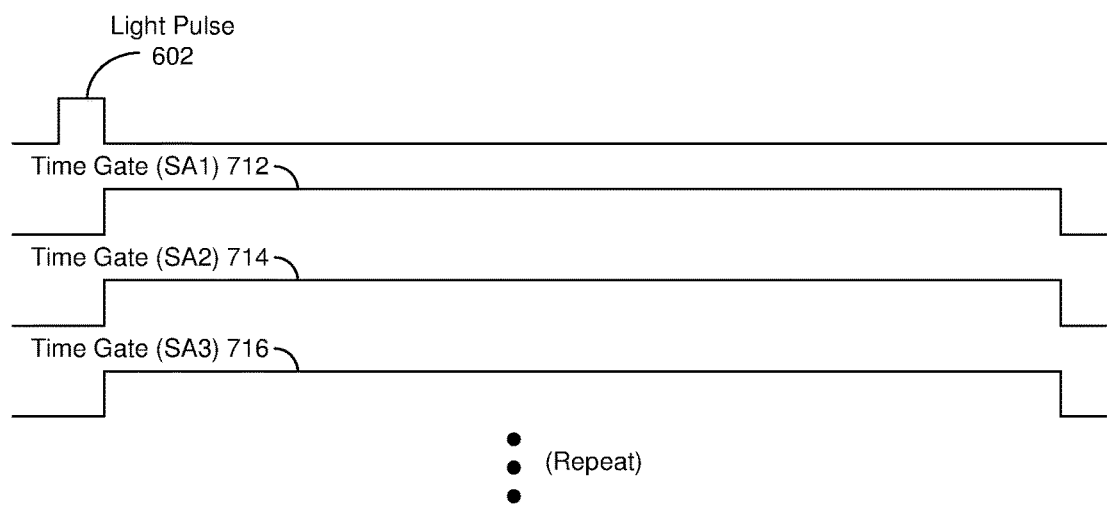
FIG. 7 is a timing diagram of exemplary operation of the flash-based system of FIG. 4 in a proximity sensor mode.

Flash-based depth system 400, in some examples, may operate at times in a proximity sensor mode, in which detection of one or more objects within some range or depth of flash-based depth system 400 may be prioritized over generating more accurate depth measurements. FIG. 7 is a timing diagram 700 of exemplary operation of flash-based depth system 400 in a proximity sensor mode. In such examples, after flash source 402 emits light pulse 602, time gates 712, 714, 716 (e.g., for SPAD subarrays 504 SA1, SA2, and SA3, respectively) may be opened and remain open for some extended period of time (e.g., compared to time gates 612, 614, 616 of FIG. 6). Such period of time may correspond to a particular distance from flash-based depth system 400 (e.g., 0.5 meters (m) to 1.0 m). During that time, one or more SPADs 502 of each corresponding SPAD subarray 504 may indicate some reflected light 112 (e.g., one or more photons) have been received. Depending on whether a SPAD 502 receives reflected light 112 during time gate 712, 714, 716 (or, in the case the process is repeated tens, hundreds, or thousands of times, as discussed above, and the number of times the SPAD 502 has received a photon exceeds some predetermined threshold), depth measurement subsystem 408 may determine that one or more objects may be located within some proximity to flash-based depth system 400 in the region of interest associated with that SPAD 502. Further, in some examples, based on a determination that such an object may be present in a region of interest associated with a particular SPAD 502, in some examples, light control subsystem 406 may probe that region of interest with greater depth resolution using the SPAD subarray 504 that includes that particular SPAD 502, such as that described above in conjunction with FIG. 6. Additionally, in some examples, the proximity sensor mode may be employed using less than all of SPAD subarrays 504 while more specific depth measurements are being made using other SPAD subarrays 504 simultaneously.

Figure 8:
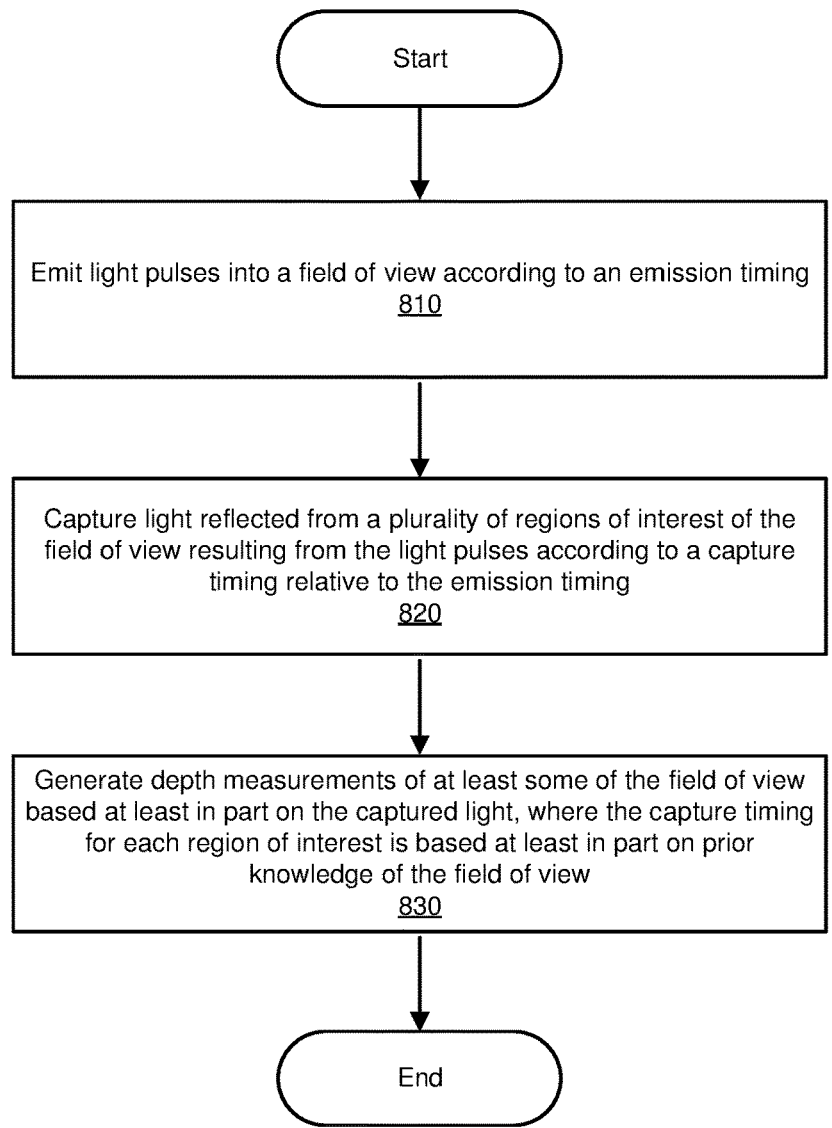
FIG. 8 is a flow diagram of an exemplary method for flash-based LIDAR depth measurement.

FIG. 8 is a flow diagram of an exemplary method 800 for flash-based LIDAR depth measurement (e.g., using flash-based depth system 400). At step 810, light pulses (e.g., light pulses 602) may be emitted into a field of view (e.g., field of view 120) according to an emission timing. At step 820, light reflected (e.g., reflected light 112) from a plurality of regions of interest of the field of view resulting from the light pulses may be captured according to a capture timing relative to the emission timing (e.g., via time gates 612, 614, 616, 712, 714, 716, as generated by light control subsystem 406). At step 830, depth measurements of at least some of the field of view may be generated (e.g., using depth measurement subsystem 408) based at least in part on the captured light, where the capture timing for each region of interest may be based at least in part on prior knowledge (e.g., prior depth information 409) of the field of view. In some embodiments, depth measurement subsystem 408, via light control subsystem 406, may alter the particular depths, depth resolutions, and even modes of operation (e.g., high-resolution depth mapping mode versus proximity sensor mode) over time for one or more SPAD subarrays 504, and may employ different depths, depth resolutions, and modes of operations simultaneously for different SPAD subarrays 504, possibly based on prior depth information 409.

Figure 9:
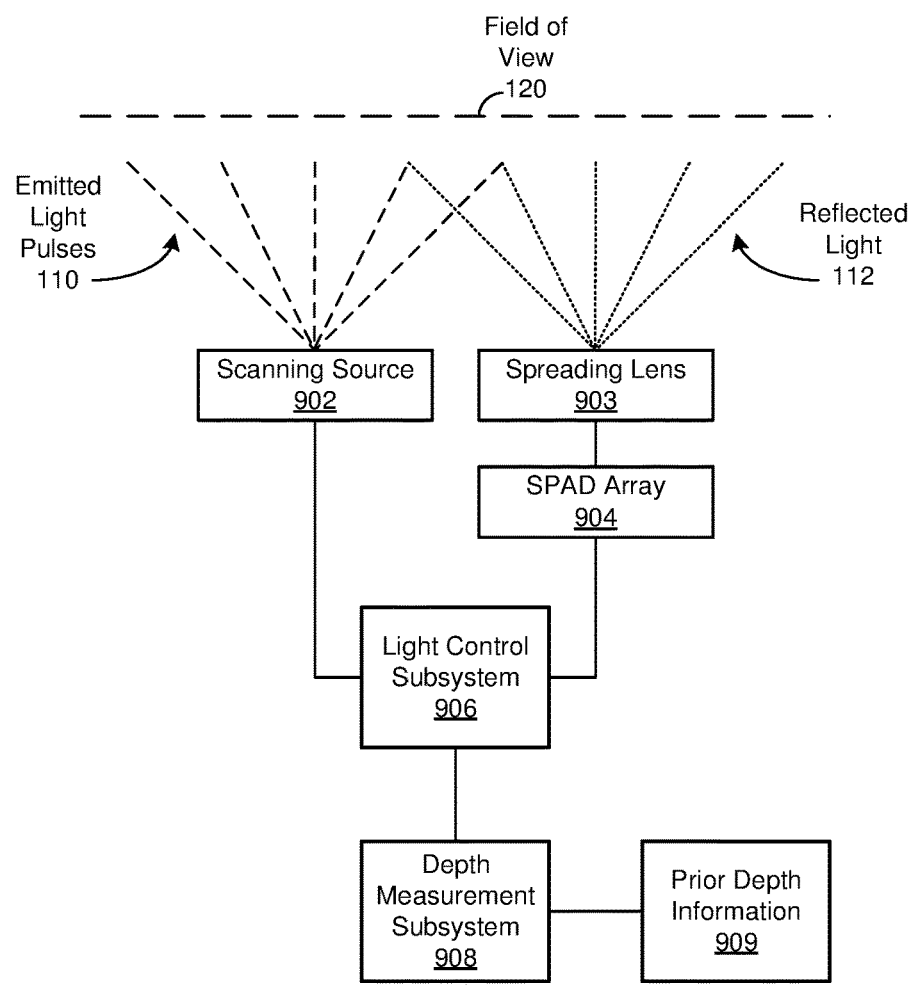
FIG. 9 is a block diagram of an exemplary system for scan-based LIDAR depth measurement.

FIG. 9 is a block diagram of a scan-based depth system 900 that may serve, in some examples, as a type or class of depth systems 100 and 200 of FIGS. 1 and 2. As illustrated in FIG. 9, scan-based depth system 900 may include a scanning source 902 (e.g., serving as light source 102), a spreading lens 903, a SPAD array 904 (e.g., serving as light sensor array 104), a light control subsystem 906 (e.g., serving as light control subsystem 106), a depth measurement subsystem 908 (e.g., serving as depth measurement subsystem 108), and prior depth information 909 (serving as prior depth information 109).

In some embodiments, scanning source 902 may emit one or more light pulses 110 that illuminate corresponding portions (e.g., regions of interest) of field of view 120. Moreover, in at least some cases, a single light pulse 602 may be directed toward a particular region of interest, followed by another single light pulse 602 directed to another region of interest, in sequence, until some or all regions of interest of field of view 120 have been illuminated. An example of scanning source 902 may be a scanning laser light source (e.g., one or more VCSELs, a solid-state optical phased scanning array, a laser with a moving mirror, a MEMS (microelectromechanical system) based scanning laser, or the like). In some examples, light control subsystem 906 (e.g., in response to one or more commands from depth measurement subsystem 908) may direct scanning source 902 to illuminate particular regions of interest in sequence by directing scanning source 902 to a series of particular angles (e.g., elevation and azimuth) relative to field of view 120, or to a series of areas (e.g., regions of interest) of field of view 120. As a result, emitted light pulses 110 may be concentrated in, or directed to, a smaller area (e.g., a region of interest) of field of view 120, as opposed to an entirety of field of view 120, at various points in time. In some examples, emitted light pulses 110 may form a line, a spot, or some other shape concentrated in the region of interest to which emitted light pulses 110 are directed.

In a manner similar to flash-based depth system 400, in some embodiments, scan-based depth system 900 may include a SPAD array 904 to receive or capture reflected light 112 resulting from emitted light pulses 110 generated by scanning source 902. In some examples, SPAD array 904 may include individual SPADs that may be organized into groups as SPAD subarrays. Also, in some embodiments, scan-based depth system 900 may also include a spreading lens 903 that directs reflected light 112 from field of view 120 to SPAD array 904. In some examples, spreading lens 903 may direct reflected light 112 received from a particular region of interest to a corresponding area (e.g., a SPAD subarray) of SPAD array 904. In some embodiments, based on the concentration of emitted light pulses 110 into a region of interest by scanning source 902, as described above, each SPAD of a SPAD subarray may be expected to receive a higher number of photons in reflected light 112 compared to SPADs 502 of SPAD array 404 of flash-based depth system 400. In some embodiments, spreading lens 903 may be an imaging lens (e.g., a lens for focusing reflected light 112 onto SPAD array 904) that may exhibit a substandard, or less-than-traditional, modulation transfer function (MTF), which may cause reflected light 112 to be "spread" and directed to a SPAD subarray of SPAD array 904 that corresponds to the region of interest from which reflected light 112 is received.

Figure 10:
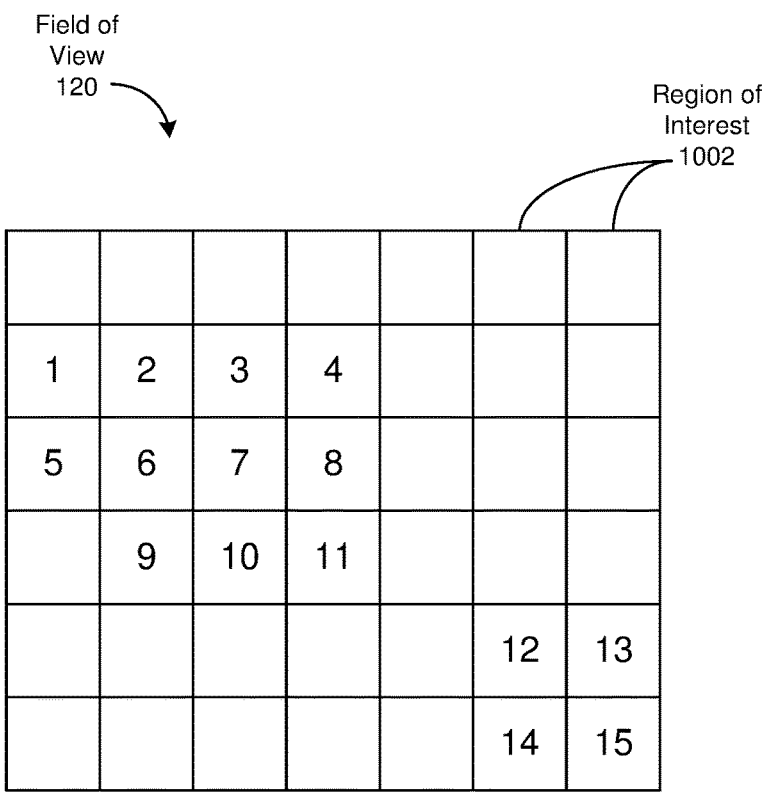
FIG. 10 is a diagram of exemplary operation of the scan-based system of FIG. 9 involving scanning of selective regions of interest within a field of view.

FIG. 10 is a diagram of a selective scanning example 1000 of operating scan-based depth system 900, in which specific regions of interest 1002 within field of view 120 are selected for scanning over some period of time. While regions of interest 1002 are directed as squares of a grid, regions of interest may be rectangles, spots (e.g., circles) or other shapes, and may or may not overlap, in other examples. As depicted in FIG. 10, less than all regions of interest 1002 are scanned (e.g., have emitted light pulses 110 directed thereto) in order, as indicated by an ordinal number (e.g., 1, 2, 3, and so on), during a single sequential pass through the selected regions of interest 1002. In some embodiments, depth measurement subsystem 908, by way of light control subsystem 906, may identify the particular regions of interest 1002 to be scanned, as well as possibly the order in which regions of interest 1002 are scanned, based on prior depth information 909. For example, some regions of interest 1002 may not be expected to exhibit changes in depth information very often, thus allowing depth measurement subsystem 908 to scan those regions less often. In another example, an object that was recently detected in a region of interest 1002 may cause depth measurement subsystem 908 to scan that region, as well as regions nearby, more often to determine a movement speed and direction of the object. Many other circumstances involving the selection of regions of interest 1002 to be scanned based on prior depth information 909 are also possible.

Due to the focusing of emitted light pulses 110 into a particular region of interest 1002 at any particular time, only a corresponding group of SPADs (e.g., a SPAD subarray of SPAD array 904 corresponding to the illuminated region of interest 1002) may be expected to receive any reflected light 112. Accordingly, in some embodiments, light control subsystem 906 may deactivate the remaining SPADs of SPAD array 904 for that period of time to save electrical power.

Figure 11:
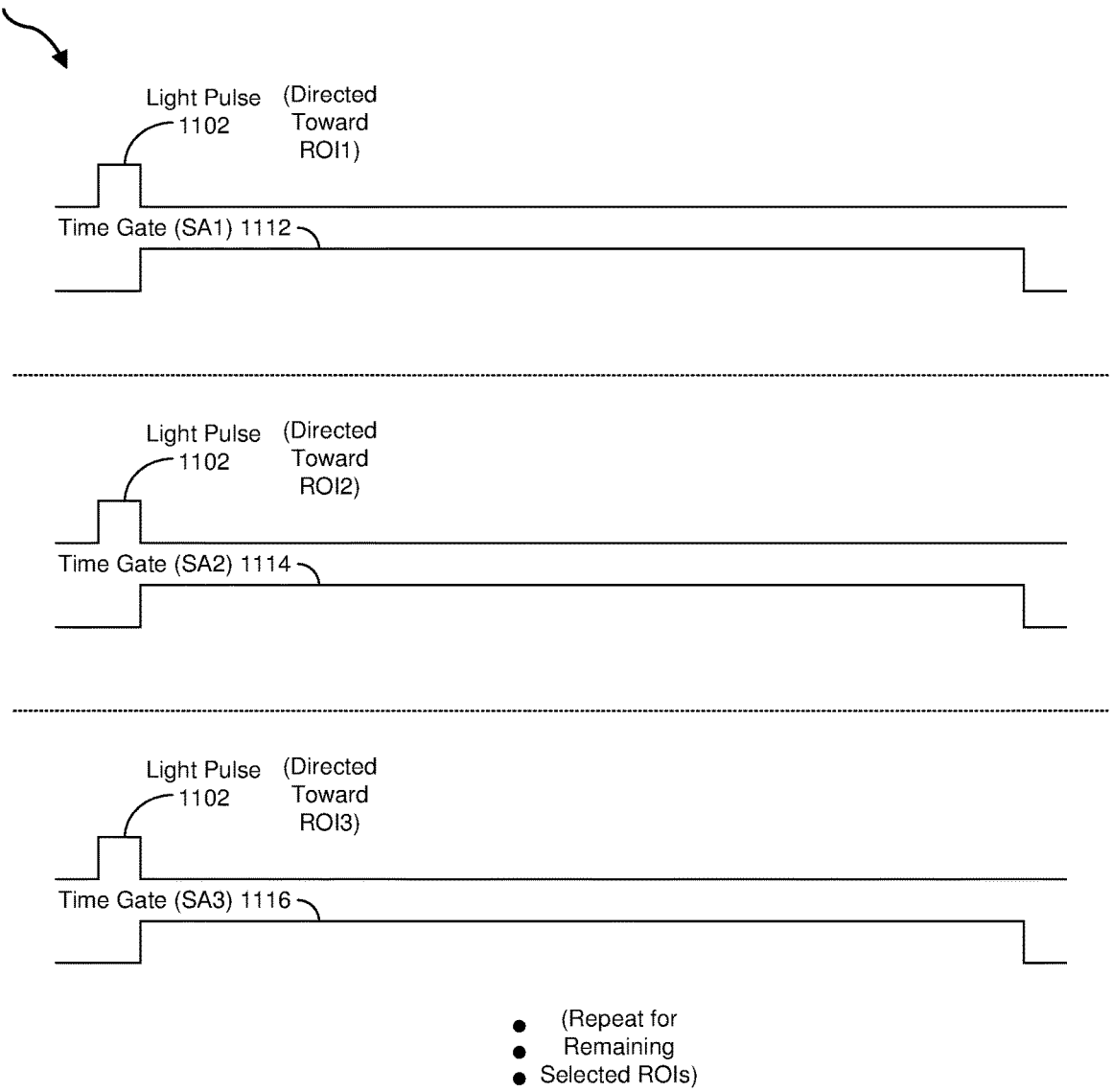
FIG. 11 is a timing diagram for exemplary operation of the scan-based system of FIG. 9.

FIG. 11 is a timing diagram of exemplary scanning light and SPAD timing 1100 during operation of scan-based depth system 900 (e.g., as directed by depth measurement subsystem 908 by way of light control subsystem 906), in some embodiments. As illustrated in FIG. 11, light control subsystem 906 may cause scanning source 902 to emit a light pulse 1102 directed toward a particular region of interest 1002 ROI1. At some time after the emission of light pulse 1102, light control subsystem 906 may generate a time gate 1112 for SPAD subarray SA1 (e.g., corresponding to region of interest 1002 ROI1) during which the SPADs of SPAD subarray SA1 may capture reflected light 112 resulting from light pulse 1102. In some embodiments, time gate 1112 may be opened shortly after the emission of light pulse 1102 and remain open for some extended period of time compared to time gates 612, 614, 616 of FIG. 6. As discussed above, multiple SPADs of SPAD subarray SA1 may be expected to receive photons as a result of the concentration of light pulse 1102 to region of interest 1102 ROI1. Consequently, time gate 1112 SA1 may be held open for an extended period of time to collect photons over a longer time period corresponding to a more extensive range of depth (e.g., a complete depth of interest) from scan-based depth system 900. In such examples, a time at which the photons arrive at the SPADs of SPAD subarray SA1, thus indicating a depth of an object from scan-based depth system 900, may be determined by a counting or timing circuit, as described in greater detail below in connection with FIG. 12, as opposed to rescanning regions of interest using shorter, multiple time gates 612, 614, 616 of differing depths to cover a depth range of interest, as discussed above.

After light pulse 1102 and time gate 1112 associated with region of interest 1002 ROI1 and SPAD subarray SA1, light control subsystem 906 may cause scanning source 902 to emit another light pulse 1102, this time directed toward a second region of interest 1002 ROI2. After the emission of light pulse 1102 for region of interest 1002 ROI2, light control subsystem 906 may generate time gate 1114 for associated SPAD subarray SA2 for an extended period time at least similar to that of time gate 1112 for SA1, as discussed above. Afterward, a third light pulse 1102 directed toward a third region of interest 1002 ROI3, followed by a time gate 1116 for corresponding SPAD subarray SA3. Scanning of remaining regions of interest 1002 may then continue in succession.

In some embodiments, scanning regions of interest 1002 in a serial fashion, as described above, may facilitate the capturing and processing of reflected light 112 in a pipelined manner to generation the desired depth measurements. For example, light control subsystem 906 may control the emission timing of scanning source 902 and the capture timing of SPAD array 904 to generate a first output (e.g., for a first region of interest 1002). Thereafter, depth measurement subsystem 908 may generate depth measurements based at least in part on that first output while light control subsystem 906 controls the emission timing of scanning source 902 and the capture timing of SPAD array 904 to generate a second output (e.g., for a second region of interest 1002). In some examples, the process may continue in such a manner, in which depth measurements based on an output of SPAD array 904 are generated while a subsequent output of SPAD array 904 is being created. Additionally, in some embodiments, a physical stack configuration of SPAD array 904, light control subsystem 906, and depth measurement subsystem 908, similar to that illustrated in FIG. 2, may facilitate such pipelined processing.

Figure 12:
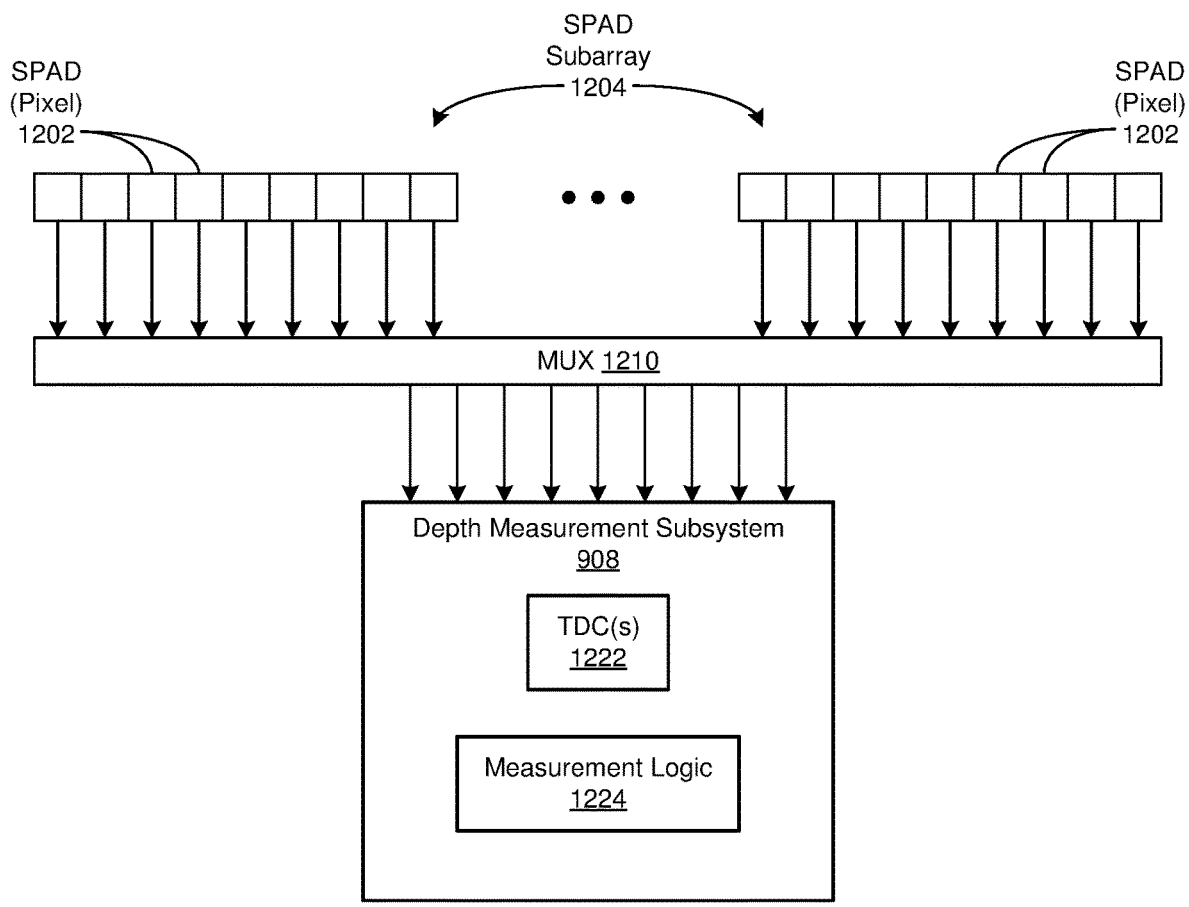
FIG. 12 is block diagram of an exemplary depth measurement subsystem in conjunction with a light sensor array of the scan-based system of FIG. 9.

FIG. 12 is a block diagram of an example of depth measurement subsystem 908 in conjunction with SPAD subarrays 1204 of SPAD array 904 in scan-based depth system 900. In at least some examples, depth measurement subsystem 908, in conjunction with light control subsystem 906, may operate in a pipelined fashion, as discussed above. In this example, depth measurement subsystem 908 may be coupled with each SPAD subarray 1204 (each of which may include multiple SPADs 1202) by way of a multiplexer 1210. In various embodiments, multiplexer 1210 may be controlled by either or both light control subsystem 906 or depth measurement subsystem 908 to couple one SPAD subarray 1204 at a time to depth measurement subsystem 908. In such embodiments, since one SPAD subarray 1204 at a time may be actively receiving reflected light 112, due to the scanning nature of scan-based depth system 900, multiplexer 1210 may operate to couple any single SPAD subarray 1204 of SPAD array 904 at a time to depth measurement subsystem 908. While each SPAD 1202 may be included in exactly one SPAD subarray 1204 in some embodiments (e.g., as shown in FIG. 12), one or more SPADs 1202 may be included in multiple SPAD subarrays 1204 (e.g., SPAD subarrays 1204 may overlap) in other examples.

In the example of FIG. 12, depth measurement subsystem 908 may include one or more time-to-digital converters (TDCs) 1222 (or other timing or counting devices) and measurement logic 1224 (e.g., to measure a roundtrip time from the emission of light pulse 1102 until the capture of light at SPADs 1202 that was reflected from region of interest 1002). In some embodiments, either or both multiplexer 1210 or TDC 1222 may be incorporated within depth measurement subsystem 908 or light control subsystem 906. In some embodiments, TDC 1222 may measure a length of time associated with capturing reflected light 112 by one or more SPADs 1202 of SPAD subarray 1204 currently coupled by multiplexer 1210 to TDC 1222. In some examples, TDC 1222 may provide an indication (e.g., a digital value) of a length of time from some reference point in time (e.g., the start or end of light pulse 1102, or the beginning of time gate 1112, 1114, 1116) until a time at which an output associated with one or more SPADs 1202 of SPAD subarray 1204 is detected. Thus, in some embodiments, TDCs 1222 may be active during the same time that time gate 1112, 1114, 1116 for the currently-active SPAD subarray 1204 is active. In other examples, TDC 1222 may provide an indication of a length of time from a time at which an output associated with one or more SPADs 1202 of SPAD subarray 1204 is detected until some predetermined ending time thereafter. Other triggering mechanisms for TDCs 1222 are also possible.

Many different examples of employing one or more TDCs 1222 may exist in generating a present depth measurement associated with SPAD subarray 1204. In one example, each SPAD 1202 of SPAD subarray 1204 may be coupled to a separate TDC 1222 such that an arrival time of one or more photons of each SPAD 1202 may be determined. In some embodiments, TDC 1222 may be triggered in response to a current from its corresponding SPAD exceeding some predetermined threshold. The arrival times may be forwarded to measurement logic 1224, which may combine the arrival times in some manner to generate an overall arrival time (and an associated measured depth) associated with SPAD subarray 1204 corresponding to a particular region of interest 1002. The combining of the arrival times, in some embodiments, may take any of a number of forms, such as averaging the arrival times, determining the median or mode arrival time, and so on.

In other examples, SPADs 1202 of SPAD subarray 1204 may be coupled to a single TDC 1222 such that a single arrival time is generated. In some embodiments, output electrical currents from SPADs 1202 may be summed together and compared against some electrical current threshold. If the summed electrical currents surpass the threshold, the time at which such an event occurs may trigger TDC 1222 to register the single arrival time. In other examples, an electrical current threshold may be employed for comparison against the output current of each SPAD 1202 of SPAD subarray 1204 individually. The result of each comparison may be a binary (yes/no) value, with these values being combined (e.g., by way of voting logic) and provided to TDC 1222 such that the recordation of the arrival time may be triggered when the number of SPADs 1202 of SPAD subarray 1204 providing an electrical current surpassing the electrical current threshold exceeds some voting threshold value. Many other ways of generating an overall arrival time for SPAD subarray 1204 of a corresponding region of interest 1002 may be utilized in other embodiments.

Figure 13:
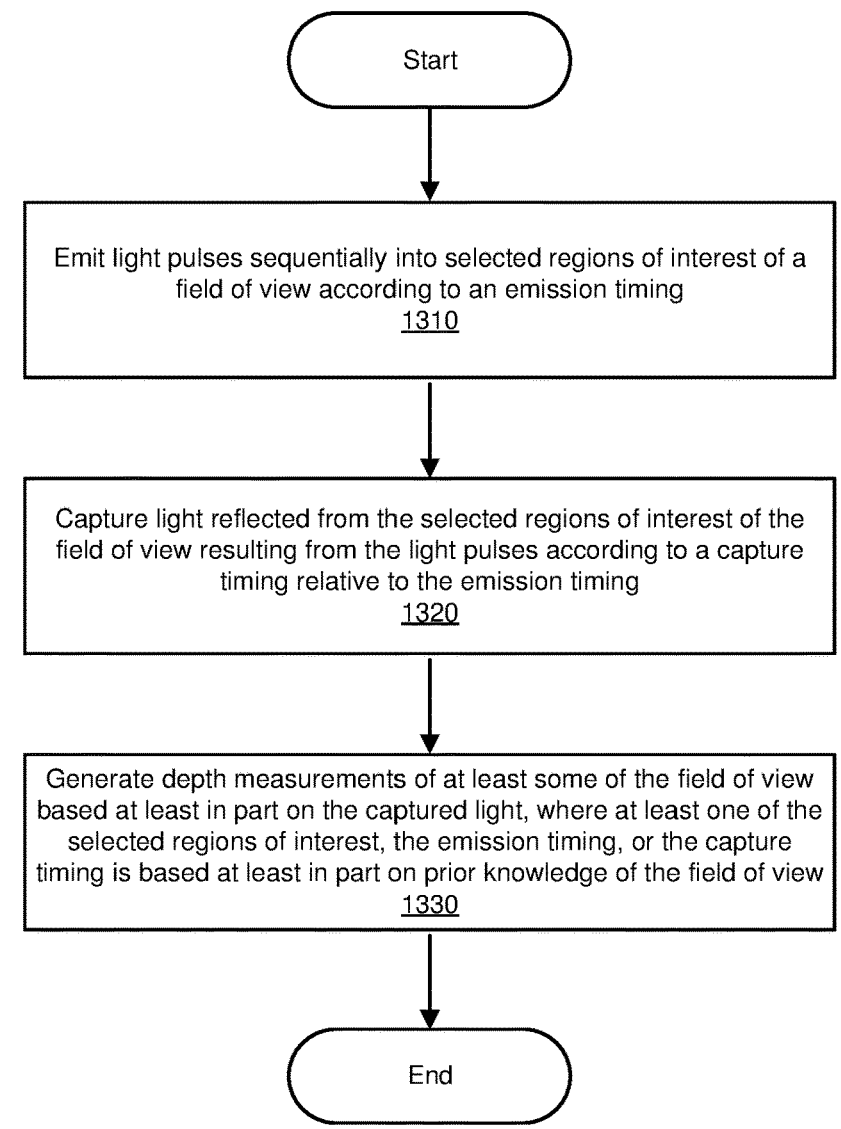
FIG. 13 is a flow diagram of an exemplary method for scan-based LIDAR depth measurement.
Figure 14:
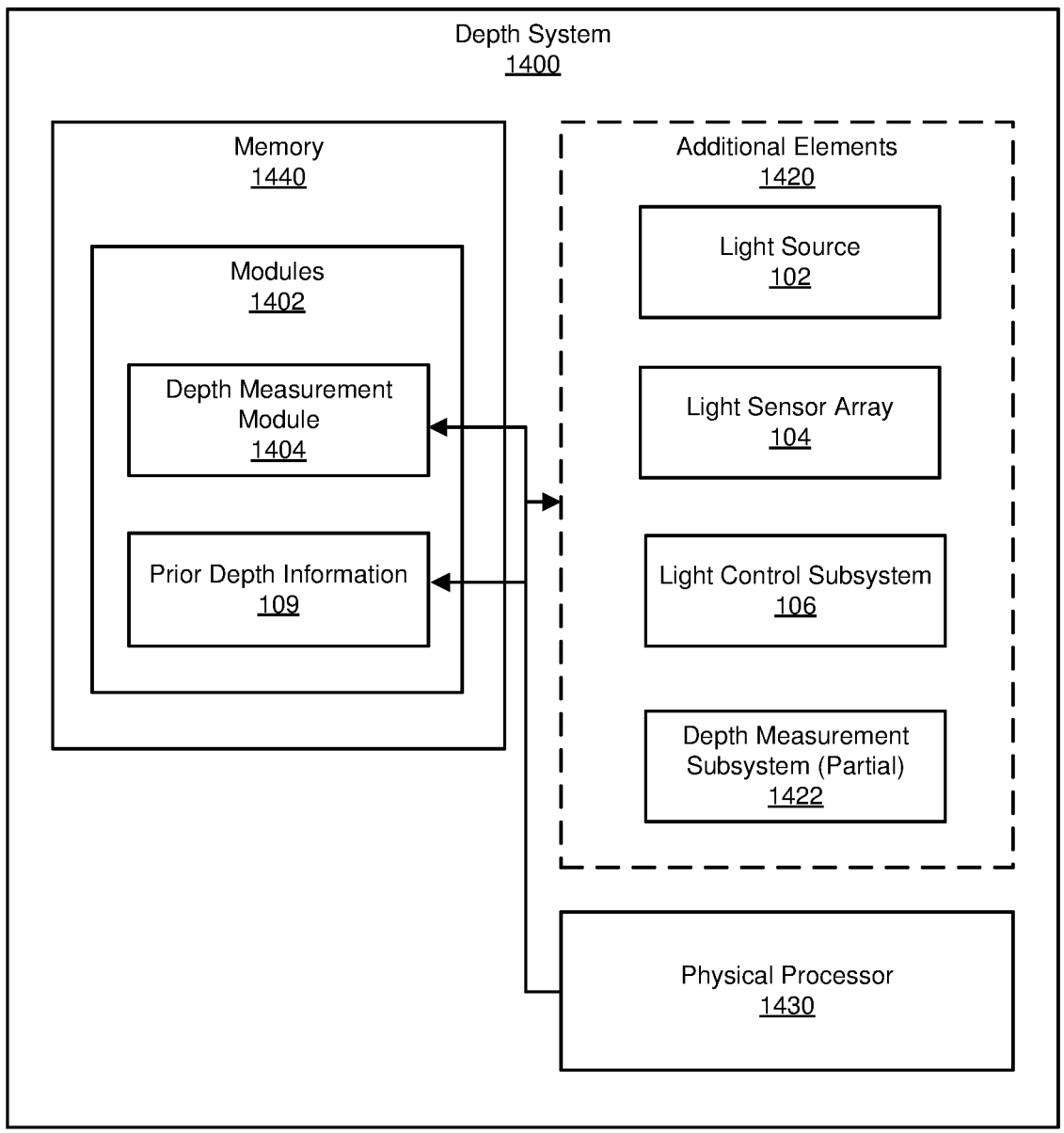
FIG. 14 is a block diagram of an exemplary system for LIDAR depth measurement.

FIG. 13 is a flow diagram of an exemplary method 1300 for scan-based LIDAR depth measurement (e.g., using scan-based depth system 900). At step 1310, light pulses (e.g., light pulses 1102) may be emitted sequentially (e.g., by scanning source 902) into selected regions of interest (e.g., region of interest 1002) of a field of view (e.g., field of view 120) according to an emission timing (e.g., generated by light control subsystem 906). At step 1320, light (e.g., reflected light 112) reflected from the selected regions of interest that result from the light pulses may be captured (e.g., by SPAD array 904 and possibly spreading lens 903) according to a capture timing (e.g., generated by light control subsystem 906) relative to the emission timing. At step 1330, depth measurements of at least some of the field of view may be generated (e.g., by depth measurement subsystem 908) based at least in part on the captured light, where at least one of the selected regions of interest, the emission timing, or the capture timing is based at least in part on prior knowledge of the field of view (e.g., prior depth information 909).

FIG. 14 is a block diagram of an example depth system 1400 for measuring depth using LIDAR. As illustrated in this figure, example depth system 1400 may include one or more modules 1402 for performing one or more tasks. As will be explained in greater detail below, modules 1402 may include a depth measurement module 1404 and prior depth information 109. Although illustrated as separate elements, one or more of modules 1402 in FIG. 14 may represent portions of a single module or application.

In certain embodiments, one or more of modules 1402 of FIG. 14 may represent one or more software applications or programs that, when executed by a computing device, may cause the computing device to perform one or more tasks. For example, one or more modules 1402 may represent modules stored and configured to run on one or more computing devices. One or more modules 1402 in FIG. 14 may also represent all or portions of one or more special-purpose computers configured to perform one or more tasks.

As illustrated in FIG. 14, depth system 1400 may also include one or more memory devices, such as memory 1440. Memory 1440 generally represents any type or form of volatile or non-volatile storage device or medium capable of storing data and/or computer-readable instructions. In one example, memory 1440 may store, load, and/or maintain one or more of modules 1402. Examples of memory 1440 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

Also, as illustrated in FIG. 14, depth system 1400 may also include one or more physical processors, such as physical processor 1430. Physical processor 1430 generally represents any type or form of hardware-implemented processing unit capable of interpreting and/or executing computer-readable instructions. In one example, physical processor 1430 may access and/or modify one or more modules 1402 stored in memory 1440. Additionally or alternatively, physical processor 1430 may execute one more of modules 1402 to facilitate depth measurement of field of view 120, as described above. Examples of physical processor 1430 may include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As depicted in FIG. 14, depth system 1400 may also include additional elements 1420, including, without limitation, light source 102, light sensor array 104, light control subsystem 106, and possibly a portion of depth measurement subsystem 1422 (e.g., at least some hardware portion of depth measurement subsystem 108). Various embodiments of these additional elements 1420, possibly in addition to others described above, may also be included.

Regarding modules 1402, depth measurement module 1404, when executed by physical processor 1430, may serve to operate as at least a portion of depth measurement subsystem 108 (e.g., a software-based portion of depth measurement subsystem 108), as well as various embodiments and variations thereof, as discussed above. Prior depth information 109 may be a database, one or more data tables, or other data structures that may include current or recent depth information (e.g., distances from depth system 1400) of a surrounding environment within which depth system 1400 is located, part of which may include a present field of view 120. In some embodiments, as depth system 1400 may physically translate and/or rotate within the environment, the present field of view 120 may change. In some examples, depth information 109 may include a map (e.g., relative to some reference point and/or reference orientation) from which depth information for a particular field of view 120 may be generated. Additionally, in some embodiments, new depth information generated by depth measurement subsystem 108 may be incorporated into such a map.

Figure 15:
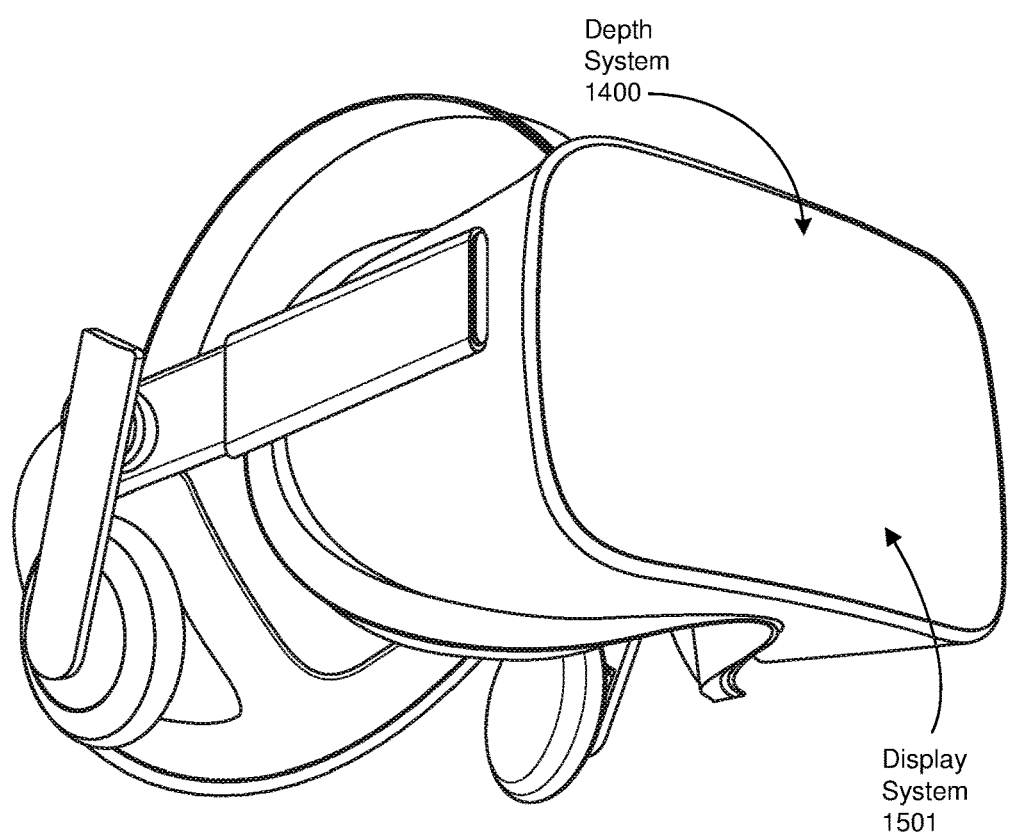
FIG. 15 is a perspective view of an exemplary head-mounted display (HMD) in which the system of FIG. 14 may be incorporated.
Figure 16:
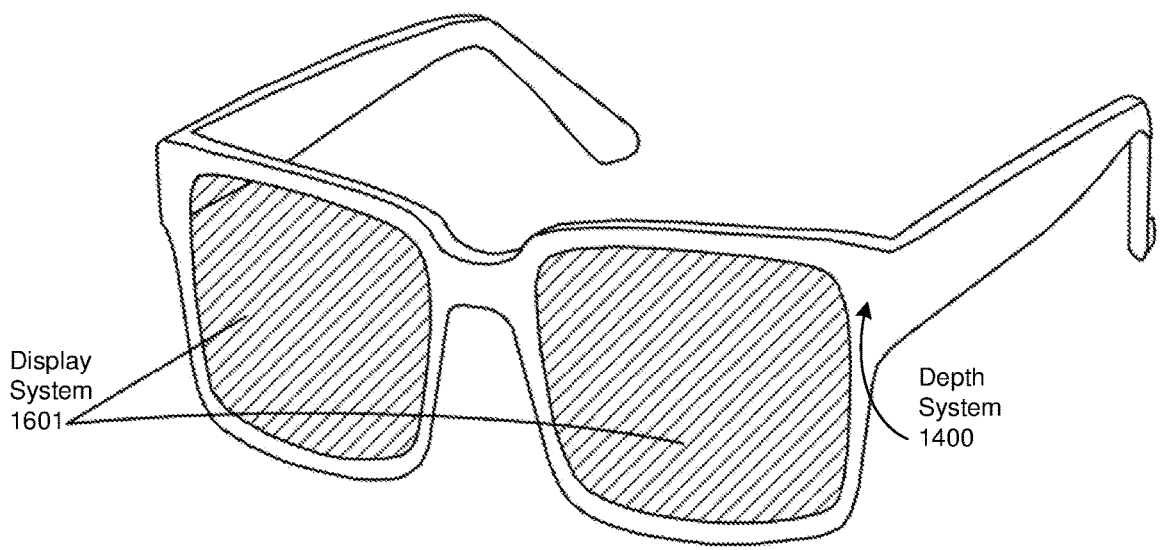
FIG. 16 is a perspective view of an exemplary near-eye display (NED) in which the system of FIG. 14 may be incorporated.

FIG. 15 is a perspective view of an exemplary head-mounted display (HMD) 1500 in which depth system 1400 of FIG. 14 may be incorporated, along with a display system 1501 for presenting images to a user of HMD 1500. Similarly, FIG. 16 is a perspective view of an exemplary near-eye display (NED) 1600 in which depth system 1400 of FIG. 14 may be incorporated, in addition to a display system 1601. In such examples, depth system 1400 may be employed to track an environment within which a user of HMD 1500 or NED 1600 is located. In some examples, depth system 1400 may be employed to alter a presentation of images by display systems 1501 or 1601, to warn the user of possible collisions with objects within the environment, and the like.

HMD 1500 and NED 1600 are two examples of an artificial reality (AR) system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an HMD connected to a host computer system, a standalone HMD, a NED, a mobile device or computing system, or any other hardware platform capable of providing artificial reality content to one or more viewers.

As discussed through the instant disclosure, the disclosed systems and methods may provide LIDAR-based depth measurement that employs at least some knowledge of prior depth information of the local environment. By leveraging such knowledge, current depth measurements may be performed quickly and accurately while requiring less space, electrical power, and/or component expense, thus rendering such systems and methods well-suited for use within an artificial reality (AK system (e.g., HMD 1500, NED 1600, and so on). However, other types of systems requiring some knowledge of a physical environment (e.g., vehicle navigation systems, mobile robotic systems, and so on) may also benefit from aspects of the disclosed systems and methods in other embodiments.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data regarding received light to be transformed, transform the light data into depth measurement data, output a result of the transformation to update depth information regarding a field of view, use the result of the transformation to update a map of a local environment, and store the result of the transformation to perform other functions, such as image display modification, local collision warning, local environment navigation, and the like. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a light source that emits light pulses into a field of view;
a light sensor array that captures light reflected from the field of view resulting from the light pulses;
a light control subsystem that:
controls an emission timing of the light source; and
controls a capture timing of the light sensor array relative to the emission timing of the light source; and
a depth measurement subsystem that generates depth measurements of at least some of the field of view based at least in part on output from the light sensor array;
wherein operation of the light control subsystem is based at least in part on prior knowledge of the field of view, the prior knowledge of the field of view comprising prior depth measurements of at least some of the field of view taken from prior positions or orientations of the light source.

2. The system of claim 1, wherein the prior depth measurements of at least some of the field of view comprise complete or partial mappings of at least some of the field of view.

3. The system of claim 1, wherein the prior knowledge of the field of view further comprises prior depth measurements of at least some of the field of view taken from prior positions or orientations of the light sensor array.

4. The system of claim 1, wherein the light control subsystem controls the emission timing and the capture timing to generate present output from the light sensor array while the depth measurement subsystem generates depth measurements based at least in part on prior output from the light sensor array.

5. The system of claim 1, wherein the light sensor array, the light control subsystem, and the depth measurement subsystem are arranged in a stack configuration comprising the light sensor array mounted to a portion of the light control subsystem and the light control subsystem mounted to a portion of the depth measurement subsystem to allow for short electrical connections therebetween.

6. The system of claim 1, wherein the light sensor array comprises a plurality of single-photon avalanche diodes.

7. The system of claim 6, wherein:
the light control subsystem controls a flashlight and single-photon avalanche diode timing by generating a plurality of timing gates associated with single-photon avalanche diode subarrays of a single-photon avalanche diode array; and
the flashlight and single-photon avalanche diode timing is repeated multiple times for capturing the reflected light by the single-photon avalanche diode subarrays.

8. The system of claim 1, wherein:
the light source comprises an array of addressable light sources; and
the light control subsystem selects a subset of the addressable light sources to illuminate a selected region of interest in the field of view using one of the emitted light pulses.

9. The system of claim 1, wherein the light control subsystem:
controls a first capture timing comprising a first depth range and a first depth spacing between time gates corresponding to a first emitted light pulse; and
controls a second capture timing comprising a second depth range and a second depth spacing between time gates corresponding to a second emitted light pulse different from the first emitted light pulse, wherein at least one of the second depth range or the second depth spacing is different from the first depth range or the first depth spacing.

10. The system of claim 1, wherein the light control subsystem:
controls, for a first plurality of light sensors of the light sensor array, a first capture timing comprising a first depth range and a first depth spacing between time gates corresponding to a first emitted light pulse; and
controls, for a second plurality of light sensors of the light sensor array, a second capture timing comprising a second depth range and a second depth spacing between time gates corresponding to the first emitted light pulse, wherein at least one of the second depth range or the second depth spacing is different from the first depth range or the first depth spacing.

11. The system of claim 1, wherein the light control subsystem controls a first capture timing comprising a single time gate covering a first depth range corresponding to a first emitted timing pulse.

12. The system of claim 1, wherein:
the light source comprises a scanning light source that illuminates one of a plurality of selectable regions of interest in the field of view at a time; and
the light control subsystem controls the emission timing by causing the scanning light source to illuminate two or more of the selectable regions of interest in succession.

13. The system of claim 12, further comprising a lens that directs reflected light from one of the plurality of selectable regions of interest over a corresponding subset of a plurality of light sensors of the light sensor array.

14. The system of claim 13, wherein the light control subsystem disables those of the plurality of light sensors not included in the corresponding subset of the plurality of light sensors.

15. The system of claim 13, wherein the depth measurement subsystem comprises one or more time-to-digital converters that measure a length of time associated with capturing the reflected light at the corresponding subset of the plurality of light sensors.

16. The system of claim 15, wherein the time-to-digital converters are selectively couplable to the corresponding subset of the plurality of light sensors for each of the plurality of selectable regions of interest.

17. A method comprising:
emitting light pulses into a field of view according to an emission timing;
capturing light reflected from a plurality of regions of interest of the field of view resulting from the light pulses according to a capture timing relative to the emission timing; and
generating depth measurements of at least some of the field of view based at least in part on the captured light;
wherein the capture timing for each of the plurality of regions of interest is based at least in part on prior knowledge of the field of view, the prior knowledge of the field of view comprising prior depth measurements of at least some of the field of view taken from prior positions or orientations of a light source that emitted the light pulses.

18. The method of claim 17, wherein the capture timing comprises at least one of a depth range or a depth spacing for at least some of the plurality of regions of interest based at least in part on the prior knowledge of the field of view.

19. A method comprising:
emitting light pulses sequentially into selected regions of interest of a field of view according to an emission timing;
capturing light reflected from the selected regions of interest of the field of view resulting from the light pulses according to a capture timing relative to the emission timing; and
generating depth measurements of at least some of the field of view based at least in part on the captured light;
wherein at least one of the selected regions of interest, the emission timing, or the capture timing are based at least in part on prior knowledge of the field of view, the prior knowledge of the field of view comprising prior depth measurements of at least some of the field of view taken from prior positions or orientations of a light source that emitted the light pulses.

20. The method of claim 19, wherein at least one of the selected regions of interest comprises a rectangular region of interest or a circular region of interest.

\* \* \* \* \*